*INVENTORS*
DAN C. POPMA
VERNON G. COLLINS

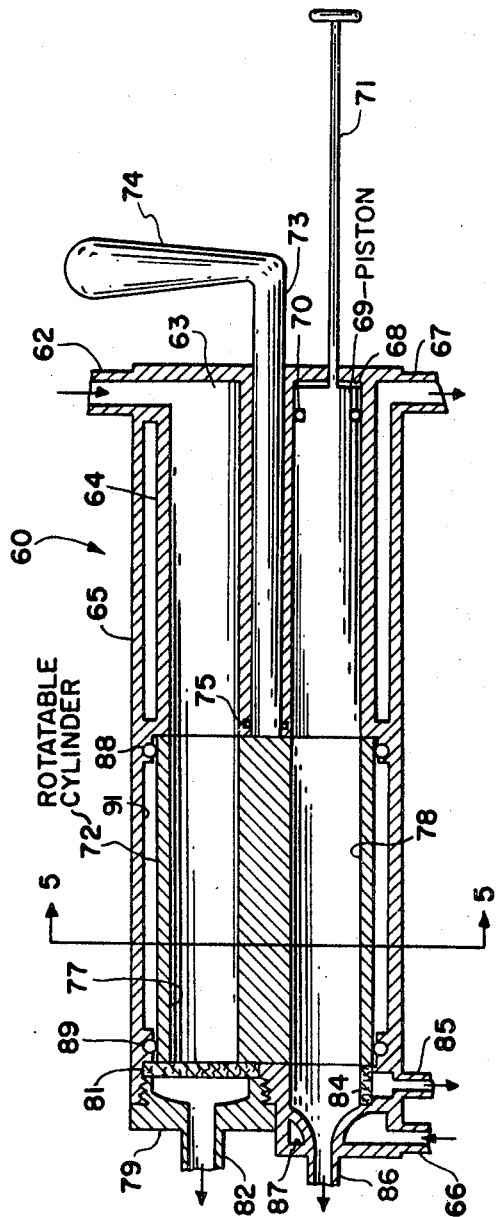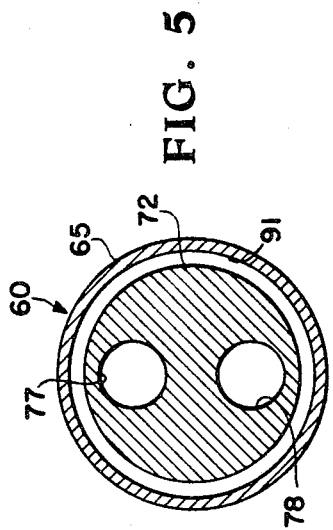

United States Patent Office 3,444,051
Patented May 13, 1969

3,444,051
RECOVERY OF POTABLE WATER FROM HUMAN WASTES IN BELOW-G CONDITIONS
Dan C. Popma, Hampton, and Vernon G. Collins, Poquoson, Va., assignors to the United States of America as represented by the Administrator of the National Aeronautics and Space Administration
Filed Mar. 8, 1967, Ser. No. 621,715
Int. Cl. C02c 1/00, 3/00; B01d 3/00
U.S. Cl. 202—182                                                 9 Claims

ABSTRACT OF THE DISCLOSURE

This invention relates to a phase change system for recovering potable water from human waste fluids and wash water under gravitational conditions of from zero to one G and relates in particular to a unique water still system free of any moving parts and having a zero-G capability and the provision for continuous removal of dissolved solids from the waste waters.

---

The invention described herein was made by employees of the United States Government and may be manufactured or used by or for the Government of the United States without the payment of any royalties thereon or therefor.

This invention relates to a water reclamation system for recovering potable water from waste fluids and relates, in particular, to a system for use on board space vehicles for recovering potable water from human waste fluids under gravitational conditions of from zero to one G.

In planetary exploration men often will find themselves in inaccessible locations for long periods of time where, in space, there are no basic raw materials, external to the ecology, from which the essentials of life can be obtained. On the lunar and planetary surfaces, techniques might be worked out whereby oxygen and water can be obtained from mineral substances but this technology does not help supply the needs of a space crew enroute to even the nearest of the planets. A Mars mission, for example, as presently anticipated, would require over 200 days each way. Excluding whatever quantity of water may be required for hygenic purposes, the water requirement for drinking amounts to more weight than the combined oxygen and food requirements of man's daily needs. With the present cost of about $1,000 to place one pound into orbit, it is imperative that the weight of a space vehicle for long term space missions be planned as conservatively as possible without jeopardizing the health and safety of the crew members.

In addition to an otherwise habitable temperature and humidity environment, man requires three basic supplies: food, oxygen and water. More than one third of this required input is expended as urine and if suitable apparatus is available to reclaim a portion of the available water from this waste material, the launch weight for a multicrew space vehicle could be materially reduced. This reclamation is not as unattractive as it may seem at first. We are readily aware that most of the water we now consume is reclaimed water of a sort. It has indeed been used and reused for centuries and is none the worse for wear. Some of the same processes that occur in nature to purify and reclaim our water can also be employed, in principle, to help balance the ecology on board a space vehicle. Because of onboard weight and volume limitations, it would not be feasible at the present time, to employ some of the techniques of nature, such as solar evaporation, aeration, percolation through soils, aerobic and anaerobic digestion as well as those processes that employ members of the plant kingdom. A number of natural as well as scientifically devised techniques, however, can be made practical for reclaiming water on board space vehicles.

A variety of methods have been proposed for recovering water from waste fluids in space. They can generally be divided into two categories: (1) those that promote a phase change and (2) those that do not. All those systems that do not promote a phase change, such as electrodialysis, multifiltration, ultrafiltration, membrane permeation, solvent extraction, hydrate formation and ion exchange, are limited in one way or another to a total recovery efficiency of less than 94%. In order to maintain a balanced ecology, it will be necessary to push the total recovery of water from waste fluids up to better than 96%. Phase change systems are capable of attaining this efficiency. Therefore, in space missions of long duration, a phase-change type of system will most certainly be on board the spacecraft, either alone or in conjunction with other water reclamation systems.

Of the phase change systems known, there are those that involve the solid stata or freezing. All these systems currently carry excessively large weight or power penalties to make them virtually impractical for space use. The other phase change systems that operate on the liquid and gaseous phase only, can be divided into two general types: (1) those that consume the heat of vaporization and (2) those that do not. In prior art systems, in order to conserve the heat of vaporization, vapor from the evaporator system must be compressed so that condensation can occur at a higher temperature. The heat of vaporization can then flow back in the evaporator if the system is designed so that this heat exchange can take place.

Straight distillation systems do not conserve the heat of vaporization but use active heating to evaporate the waste liquid and active cooling to condense the vapors. The system of the present invention is of this latter type, that is, a system that can utilize waste heat, as from a nuclear reactor or other vehicle propulsion heat to thus be more economical of operation. Zero-G distillation systems are not new; however, those presently employed usually depend upon rotating components to give them their zero-G operating capability and, evaporation is achieved in a violent manner, as by flashing, or in an unreliable manner, as by nucleate boiling from a wettable surface. Phase separation is a problem at zero-G in both the evaporator and condenser in the absence of rotating components. That is, residue tends to build up in the evaporator and its removal becomes a major problem, sometimes introducing health hazards to the crew. Another disadvantage of the presently known zero-G reclamation systems is that they consume too much power or are too heavy and have relatively low reliability due to complex mechanisms that wear and require excessive maintenance. In addition, presently known systems cannot achieve recovery efficiencies beyond 96% economically and require excessive amounts of pre- and post-treatment to control ammonia released from urea.

Accordingly, it is an object of the present invention to provide a phase change system for recovering potable water from human waste fluids with a minimum of movable parts.

Another object of the present invention is the provision of continuous removal of residue from the evaporating unit in a reliable manner under sealed and sanitary conditions.

Another object of the present invention is a phase change recovery system requiring no expendable items, such as filters or liners.

A further object of the present invention is a phase change system that acts directly on the waste material to yield acceptable water.

Further objects of the present invention include a phase change system for recovering potable water having minimum weight, volume, and power requirements and capable of operation under zero-gravity conditions.

According to this invention, the foregoing and other significant objects are attained by providing an improved water reclamation system in which waste human fluid, such for example, urine, wash water, and the like is deposited into the system and conveyed to an evaporator unit wherein the waste liquid is heated with positive separation of clean vapors from the waste liquids being effected and the clean vapors conveyed to a condenser unit and condensed into potable water. The evaporator unit of the present invention is in fluid connection with a residue removal unit with the waste liquids being conveyed from the evaporator to the residue removal unit wherein solid waste salts and the like are precipitated out of the waste fluid and deposited in a residue storage area with the remaining liquid being reconveyed to the evaporator for further evaporation and separation therefrom of clean vapors.

A more complete appreciation of the invention and many of the attendant advantages thereof will be better understood by reference to the following detailed description when considered in connection with the accompanying drawings wherein:

FIG. 4 is a sectional view of the residue removal unit of the present invention; and FIG. 5 is a sectional view of the residue removal unit taken along lines 5—5 of FIG. 4.

Figure 1:
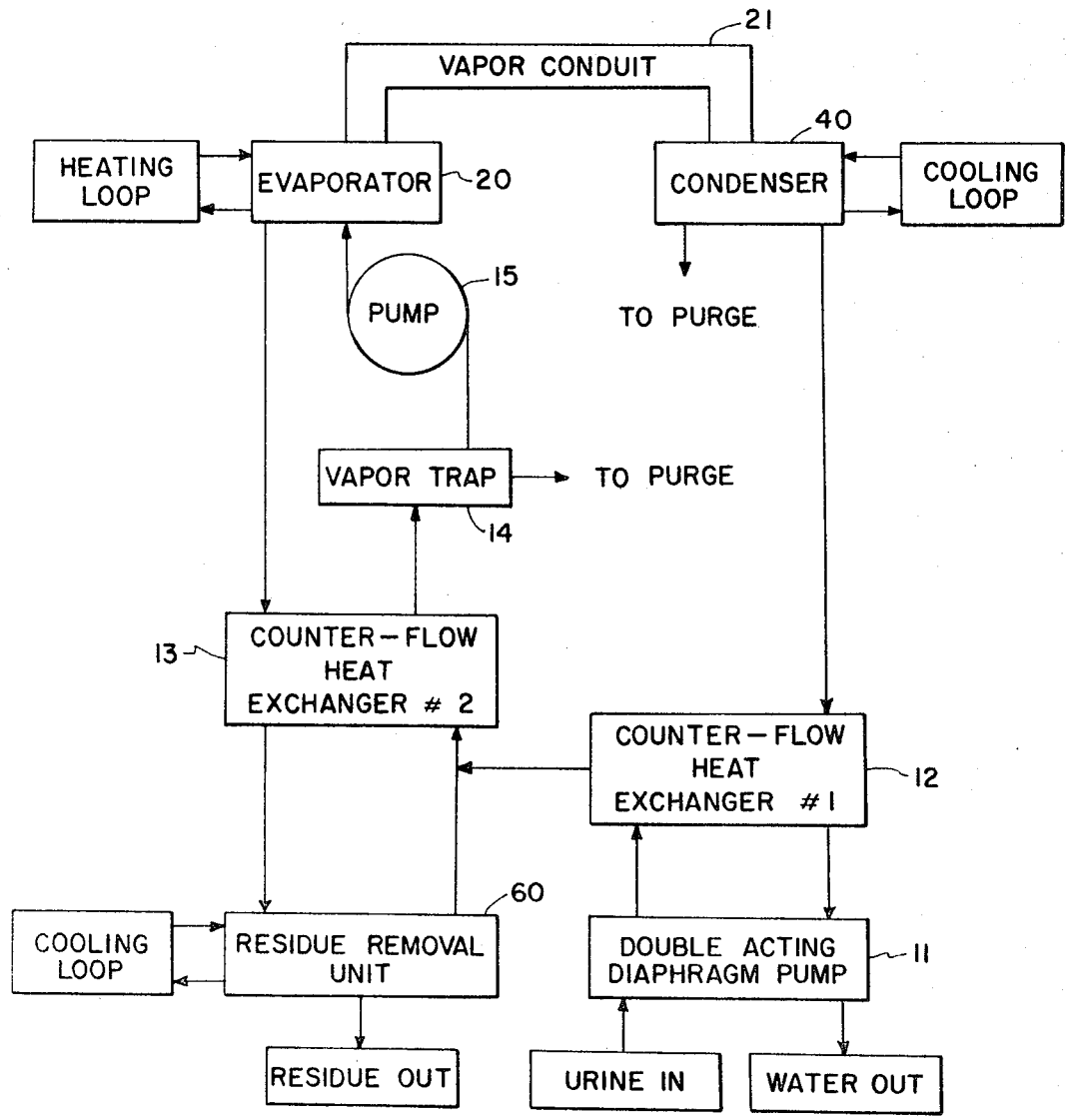
FIG. 1 is a diagrammatic representation of the zero-G water reclamation system of the present invention.

Referring now to the drawings, and more particularly to FIG. 1, the zero-G water reclamation system of the present system will now be described. The operating temperature and pressure are interdependent in the system and temperature ranges of 1° C–100° C. and a pressure range of 5–760 mm. Hg are operative. It is the difference in temperature between the evaporator and condenser units that determines process flow rate with a differential temperature of 20° C. being adequate. As shown in this figure, the waste fluid is received by a conduit leading to a double-acting diaphragm pump 11 which pumps the waste fluid through a counter-flow heat exchanger 12 to a second counter-flow heat exchanger 13, through vapor trap 14; circulating pump 15; to evaporator unit 20. The waste fluid is heated in evaporator unit 20 to, for example, a temperature of approximately 50° C. at a pressure of approximately 100 mm. Hg and the clean vapor obtained is removed from evaporator unit 20 by way of vapor conduit 21 which leads to condenser unit 40 wherein the clean vapor is condensed into usable water. A differential temperature of approximately 20° C. is maintained between the evaporator and condenser temperatures. The recovered or reclaimed water is then transferred by way of the first counterflow heat exchanger 12 back through the double-acting diaphragm pump 11 to a suitable water storage, not shown, for reuse. The concentrated brine or waste fluid remaining in evaporator unit 20 is transferred back through counterflow heat exchanger 13 to residue removal unit 60 wherein solid wastes are separated and removed, as will be more clearly explained hereinafter. After removal of the solids, the remaining liquid is reconveyed by way of heat exchanger 13, vapor trap 14, circulating pump 15, to evaporator 20 again and the process repeated. Double-acting diaphragm pump 11 is a conventional balanced pump wherein the input is balanced against the output. Counterflow heat exchangers 12 and 13 are also of conventional structure and are well known.

EVAPORATOR UNIT

Figure 2:
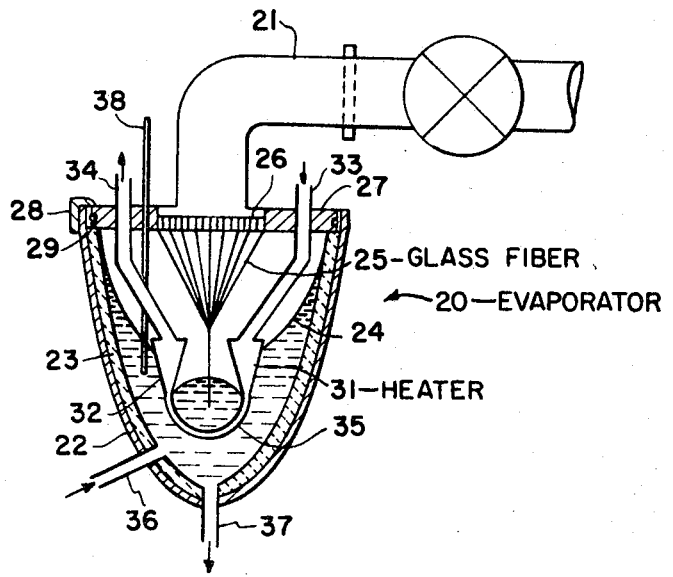
FIG. 2 is a sectional view of the evaporator unit of the present invention.

Referring now more particularly to FIG. 2, the details of the evaporator unit of the present invention will now be described. As shown in the figure, evaporator unit 20 is paraboloid in shape and includes a stainless steel outer shell 22 having a hydrophilic, porous, ceramic-like liner 23. The minimum energy law and the law of contact angle dictates that the liquid-vapor interface under zero-G conditions will be essentially as that indicated for liquid 24 shown in the drawing. The porous material 23 insures that any isolated quantity of water that becomes detached will be drawn back into the mass of water when it contacts the walls regardless of what the liquid level may be in the evaporator unit 20.

To further assist in the movement of entrained droplets back into the liquid mass, a network of hydrophilic fiber glass strands or filaments 25 are fixed, end up, from the liquid to the underside of a liquid barrier 26. A porous hydrophobic membrane having an effective pore size of 30 to 60 microns and formed of a disc of porous tetrafluoroethylene serves as an effective liquid barrier under zero-G conditions. The liquid barrier 26 is adjacent vapor conduit 21 which leads to the condenser unit, as described hereinbefore. Liquid barrier 26 is maintained in position by annular cover 27 for stainless steel casing 22, with the cover 27 being clamped in fixed position by clamp 28 and a suitable O-ring seal 29 maintaining the cover in fluid-tight relationship with stainless steel shell 22.

A network of six or more conical heaters, only two of which are shown for simplicity and designated by reference numerals 31 and 32, are disposed within and spaced from the sidewalls of shell liner 23 with suitable inlet and outlet conduits, designated by reference numerals 33 and 34, respectively, being in fluid connection with conical heaters 31 and 32 for the passage therethrough of a suitable heating fluid. The conical heaters are formed of a suitable corrosion resistant metal, such for example, stainless steel, titanium, gold or platinum with a suitable hydrophobic coating being provided on the metal surface. A thin coating of tetrafluoroethylene serves as an adequate hydrophobic coating for these elements. The inlet and outlet conduits, 33 and 34, for providing the flow of heating fluid to heaters 31 and 32, pass through cover 27 to the thermal energy management system, not shown. The thermal energy management system is also sometimes referred to as the waste heat loop since this fluid is carrying excess energy from the space vehicle's central power station to a heat sink. A heating fluid connecting link or manifold 35 extends from the tip of each of the conical heaters 31 and 32, and those not shown, for fluid connection between the respective heaters to thereby provide a continuous loop for the heating fluid passing through inlet and outlet conduits 33 and 34. A suitable conduit inlet 36 passes through the sidewall of shell 22 and its liner 23 to provide for the flow of concentrated brine into the evaporator unit 20. Also extending through the porous liner 23 and shell 22 is a residue removal conduit 37 which transfers concentrated brine to the residue removal unit 60 as explained hereinbefore. Suitable liquid level controls will maintain the liquid in unit 20 at essentially the level shown in FIG. 2 during operation of the system.

A suitable temperature and level probe 38 extends through cover 27 and into the liquid contained within evaporator unit 20 with the exposed portion thereof being visible to the occupants of the space vehicle in which the present system is to be employed.

CONDENSER UNIT

Figure 3:
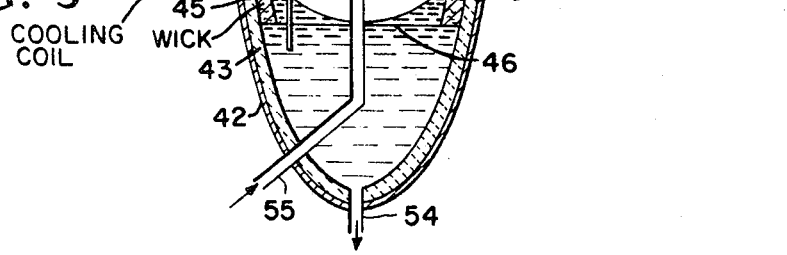
FIG. 3 is a sectional view of the condenser unit of the present invention.

Referring now more particularly to FIG. 3 the details of condensing unit 40 will now be described. Condenser unit 40 is also of a paraboloid configuration and includes an external stainless steel shell 42 and a porous ceramic-like liner 43 for shell 42. Condenser unit 40 is capable of condensing water from water vapor under conditions of zero-G. It is also capable of effecting and maintaining the separation of this water from water vapor without the use of any moving parts.

Figure 3A:
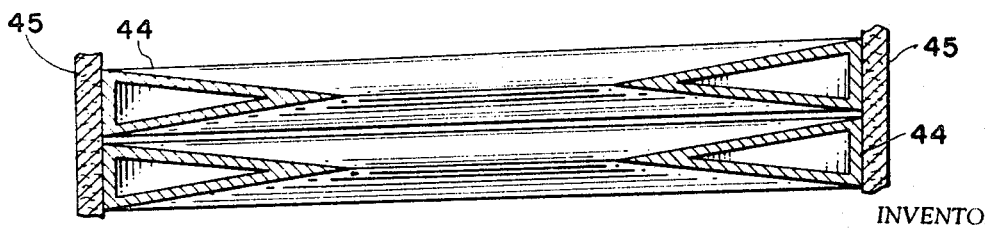
FIG. 3a is an enlarged sectional view of two adjacent coils of the heat exchanger in the condenser unit.

Condensation occurs in condenser unit 40 as the vapor passes through vapor line 21 into the condenser unit where it is exposed to a flattened, wedge-shaped cooling coil 44. As water condenses on the tapered surfaces, surface tension forces cause the water to migrate toward the spacing between the cooling loops where it contacts radially arranged wicking material 45. As shown more particularly in FIG. 3a the tubular conduit from which coil 44 is formed has the side portions thereof flattened to provide a cross-section area configuration of a long isosceles triangle. The coil is formed so that the point of this triangular configuration is directed toward the longitudinal center line of the casing 42 with the long sides of the triangular configuration serving as annular condenser plates for the system. As water vapor is condensed in to liquid it will form on these plates and, by surface tension, flow along the plates toward the base of the triangular configuration where it contacts wicking material 45.

A solid-liquid-vapor system, as is well known, tends to assume a configuration in which the free-surface energies are a minimum. That is, in the absence of other forces, such as gravity, the geometry of the condenser surfaces is such that condensed water would flow through the spacing between the turns of coil 44 and be taken away by wicking 45. These physical principles are well established for zero-G conditions and a more extensive discussion of this phenomena is found in NASA TN D–1582 entitled "Effects of Surface Energy on the Liquid-Vapor Interface Configuration During Weightlessness," published January 1963.

Thus, the radially arranged wicking material 45 is secured within liner 43 and strategically located against the spaces so as to conduct any water in the spaces into the mass of recovered water that is retained in the condenser. Wicking material 45 is annular in configuration as shown in the figure and covers the upper surface only of porous liner 43. The minimum energy law and the law of contact angle dictates that the water level 46 would be retained under zero-G conditions approximately as shown in FIGURE 3 due to the geometry of the unit and the fact that its walls are wetted by the water.

Suitable inlet and outlet cooling fluid conduits 47 and 48, respectively, provide for the flow of a cooling fluid through the internally cooled coil plates 44 within the unit. Conduits 47 and 48 lead through the cover 49 to a suitable cooling fluid source, not shown. Cover 49 is maintained within casing 42 by a suitable clamp 51 or other conventional structure, with a conventional O-ring type seal 52 insuring fluid tight connection of cover 49 with casing 42. A suitable temperature and level sensing probe 53 is also provided in condenser unit 40. Probe 53 extends through cover 49 into the water within condenser unit 40 and is visible exterior thereof to an operator within the space vehicle in which the system is employed. A suitable condenser outlet 54 is provided at the bottom of shell 42 to convey clean water to the water storage area, as described hereinbefore. A purge conduit 55 also extends through shell 42 and leads to the vapor space under the cooling coil and serves as a purge line for the entire system to maintain its pressure at some predetermined level.

RESIDUE REMOVAL UNIT

Referring now more particularly to FIGS. 4 and 5 the residue removal unit 60 of the present invention will now be described in detail. Residue removal is accomplished by the present system by a unit that combines the principle of crystallization by cooling with that of filtration.

Concentrated brine or liquid waste is removed from evaporator unit 20 under the influence of the small circulating pump and flows through the residue removal unit 60 where it is cooled approximately 10 to 15° F. below the evaporator unit temperature. The concentrated waste is received by waste conduit 62 into a first hollow barrel 63 within the cylindrical casing 64 of residue removal unit 60. An exterior cylindrical cooling jacket 65 is provided spaced from cylindrical casing 64 so as to permit the flowing of the suitable coolant between jacket 65 and casing 64 to provide internal cooling for the contents within residue removal unit 60. Cooling jacket 64 is roughly twice the length of cylindrical casing 65, as will be more fully explained hereinafter.

A second hollow barrel 68 is also provided within cylindrical casing 64 disposed 180° from the first hollow barrel 63. Barrels 63 and 68 are of identical cross-sectional area. The second barrel 68 contains a slidable piston 69 with a suitable O-ring seal 70 maintaining a fluid seal between the piston and barrel 68 but permitting slidable movement thereof. A hand shaft 71 extends through casing 64 for integral connection with piston 69. Suitable bushings, not designated, are provided around shaft 71, where it penetrates casing 64, that will freely allow the two-way passage of cabin air into and out of the space behind piston 69 when it is actuated.

A rotatable cylinder 72 of substantially the same diameter of casing 64 occupies substantially the remaining length of cooling jacket 65. An integral stem 73 extends from cylinder 72 and passes through a suitable opening provided in casing 64 between, and parallel with, barrels 63 and 68. Stem 73 is in integral connection with a control handle 74 which is adapted to be grasped by an operator to provide selective 180° reversible rotation of cylinder 72. An O-ring seal 75 is disposed around stem 73 adjacent rotatable cylinder 72 to provide a fluid-tight connection between the cylinder and the passageway for stem 73 to prevent any flow of fluid around the stem.

Cylinder 72 is provided with a pair of identical bores therethrough, as designated by reference numerals 77 and 78. Bores 77 and 78 are of identical cross-sectional area as the first and second barrel members 63 and 68. Cylinder 72 is positioned by way of control handle 74 so as to align bores 77 and 78 simultaneously with the first and second barrels 63 and 68 as shown in FIGURE 4.

A closure fitting 79 is threadedly attached to the end of jacket 65 and serves to maintain a filter 81 in alignment with barrel 63 and the respective bore 77 that is in alignment with barrel 63. Closure 79 is also provided with an opening leading to a suitable conduit 82 for conveying fluid from residue removal unit 60 back to evaporator unit 20.

A second filter member 84 is disposed adjacent bore 78, in alignment with barrel 68, and in perpendicular relationship thereto. Another conduit 85 leads from casing 64 from the opposite side of filter 84 to also return any fluid passing through this filter back to evaporator unit 20. A nozzle unit 86 is also attached to jacket 65 adjacent cylinder 72 and in alignment with barrel 68. A coolant passageway 87 is provided around nozzle 86 and in fluid connection with coolant inlet 66 and a suitable by-pass outlet, not shown, leading to the spacing between cylinder 72 and jacket 65. Nozzle 86 serves to permit the extrusion of solid waste material from residue removal unit 60 under the influence of piston 69 to a waste storage area, not shown, as will be further explained hereinafter. A pair of O-ring seals, designated by reference numerals 88 and 89, are disposed within the interior of cooling jacket 65 to provide a sealed space 91 between the cooling jacket and cylinder 72 to thereby permit the flowing of coolant through the jacket directly against the surface of cylinder 72 and thereby facilitate cooling of the contents within bores 77 and 78. Another suitable coolant by-pass, not shown, provides fluid connection between space 91 and the area between jacket 65 and casing 64.

Residue removal is accomplished, as explained hereinbefore, by combining the principle of crystallization by cooling, with that of filtration. Thus, as concentrated waste is moved from the evaporator unit 20 through the residue removal unit 60, it is cooled approximately 10 to 15° F. below the evaporator temperature. Since the solubility of most salts decreases with temperature, precipitation will occur. The solid precipitate will be retained by filter 81 to build up in the bore of rotating cylinder 72 that is "on the line" or in alignment with barrel 63 (bore 77 in FIG. 4). When bore 77 becomes full of precipitate, control handle 74 is rotated 180° by the operator. As a result of this action, filter 81 is wiped clean and bore 78 then becomes exposed to the process stream while the now "loaded" bore 77 is aligned with barrel 68 containing manually operated piston 69.

Piston 69 is manually operated after each rotation of cylinder 72 to slidably move piston 69 into the loaded bore. This action compresses the solid material within the bore and squeezes a large portion of the remaining water out of the residue to return to the evaporator by way of self-cleaning filter 84 and conduit 85. At the same time, piston 69 forces the extrusion of the solid residue through extrusion nozzle 86 to the waste storage area. After the extrusion of the waste material, piston 69 returns to the position shown in FIG. 4 due to pressure within the system so that the cycle may be repeated. That is, some fluid would reverse flow through conduit 85 and filter 84 to force piston 69 back into the operative position shown in FIG. 4. Inasmuch as filter 84 is wiped clean by the initial movement of piston 69 this return flow, although not pure water, is substantially free of salts and will be filtered again when this barrel is rotated so as to be in alignment with filter 81. A suitable check valve, not shown, is disposed adjacent the opening in nozzle 86 and prevents the back flow of solid residue into the system.

Various instrumentation, valves, details of heat exchanger structures and associated plumbing have not been described in detail in the present invention in the interest of clarity, since they are similar to those well known and used on other types of systems.

From the above description, it is believed that it is now apparent that the present water reclamation system provides an improved system for reclaiming potable water from human waste fluids that is capable of operation under zero gravity conditions and will prove practical in long range space missions, and the like. The unique features of employing geometry of design on the evaporator and condenser, making it possible to utilize the surface tension effects of the liquid alone to sustain the proper orientation and separation of liquid and vapor under zero-gravity conditions, helps eliminate or minimize the necessity of movable, replaceable and wearing parts within the system to prove a substantial advantage over presently known water reclamation systems. In addition to these features, the procedure used to continuously remove residue from the system results in a recovery of approximately 96% of the available water from human wastes. Also, since the system of the present invention does not require the use of expendable items, such as filters or liners, inasmuch as the filters used in the present system are self-cleaning in each cycle of the operation, health hazards that might be involved in changing contaminated filters and the like are minimized.

Obviously, many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A phase change system for recovering potable water from human waste fluids and washwater under gravitional conditions of 0–1G comprising, in combination:
    an evaporator unit,
    a condenser unit, and
    a residue removal unit,
    said evaporator unit providing separation of vapor from waste liquids and liquid entrainment waste received by said system,
    means for transferring the vapor separated by said evaporator to said condenser unit,
    means in fluid connection with said condenser unit for transferring the condensed water to a water stowage area,
    means for transferring concentrated waste material from said evaporator unit to said residue removal unit after said evaporator unit has separated a quantity of water vapor from the waste fluid received therein,
    said residue removal unit serving to separate solids from the concentrated waste material received and including means for extrusion of said solids to a waste storage area,
    means in fluid connection with said residue unit for returning excess fluid from said residue unit to said evaporator unit after the solid waste is removed therefrom, and wherein said evaporator unit comprises,
    a paraboloid-shaped container,
    a porous ceramic lining for said container,
    a vapor permeable liquid barrier formed at the upper surface of said container and at the base of the paraboloid,
    said liquid barrier including a network of hydrophilic capillaries, a plurality of hydrophilic filaments extending from the liquid in said evaporator to said liquid barrier whereby,
    any vapor that condenses into liquid in passing through said barrier is forced out of the capillaries by surface tension effects and made to contact one of the hydrophilic strands and thus be returned to the body of waste liquid within said evaporator; and
    means in fluid connection with the apex of said paraboloid container for transferring concentrated liquid waste from said container.

2. The system of claim 1 wherein said vapor permeable liquid barrier comprises a disk of porous tetrafluoroethylene having an effective pore size of from 30 to 60 microns and said hydrophilic filaments are glass fiber strands.

3. The system of claim 1 including a heating unit disposed within and spaced from the sidewalls of said paraboloid container, said heating unit being constructed and arranged so as to permit the circulation therethrough of a heating fluid.

4. The system of claim 2 wherein said heating unit includes a plurality of conical heating elements.

5. A phase change system for recovering potable water from human waste fluids and washwater under gravitational conditions of 0–1G comprising, in combination:
    an evaporator unit,
    a condenser unit, and
    a residue removal unit,
    said evaporator unit providing separation of vapor from waste liquids and liquid entrainment waste received by said system,
    means for transferring the vapor separated by said evaporator to said condenser unit,
    means in fluid connection with said condenser unit for transferring the condensed water to a water stowage area,
    means for transferring concentrated waste material from said evaporator unit to said residue removal unit after said evaporator unit has separated a quantity of water vapor from the waste fluid received therein,
    said residue removal unit serving to separate solids from the concentrated waste material received and including means for extrusion of said solids to a waste storage area, means in fluid connection with said residue unit for returning excess fluid from said residue unit to said evaporator unit after the solid waste is removed therefrom, and wherein said condenser unit comprises, a paraboloid-shaped container, a porous ceramic liner lining the cavity in said container, a heat exchanger disposed within said container for cooling and condensing the vapors received therein from said evaporator unit, and conduit means for transferring the condensed liquid from said condenser unit to said water storage area.

6. The system of claim 5 wherein wicking material is provided within said container and serves to conduct water as condensed to the body of water within said container.

7. The system of claim 6 wherein said heat exchanger comprises a cooling coil, said coil being formed of a tubular conduit in which side portions thereof have been flattened to thereby provide the conduit of essentially a long isosceles triangular cross-sectional configuration with the point thereof directed toward the longitudinal center of said container so as to provide wedge-shaped spaces between adjacent turns of the coil.

8. The system of claim 7 wherein said wicking material abuts said coil and as the vapors received by said condenser unit are cooled thereby they will condense on the sides of said coil turns and due to surface tension effects flow along the sloping surfaces thereof to contact said wicking material.

9. The system of claim 5 wherein said residue removal unit includes:

first and second hollow barrel means, said first barrel means being in fluid communication with said first conduit means and serving to receive the concentrated waste fluid from said evaporator unit, said second barrel means being in communication with piston driving means, a slidable piston disposed in said second barrel means, a rotatable cylinder having a pair of identical bores therethrough being disposed so as to aline said bores simultaneously with said first and second barrel means, each of said bores and said first and second barrel means being of identical cross-sectional area, said first filter means being permeable to liquid passing through said first barrel and said one bore and impermeable to the crystals precipitated out of said liquid, said second filter means being fixedly disposed adjacent said other bore, said other bore being in alinement with said second barrel means when said one bore is in alinement with said first barrel means, said slidable piston being adapted to be driven from said second barrel means into said other bore to effect squeezing of any material in said other bore with any liquid squeezed from said material being passed through said second filter and all additional material in said other bore being extruded into a waste storage area, means for selectively rotating said cylinder 180° to thereby exchange the relative positions of said bores to said first and second barrel means, said means for rotating said cylinder includes an integral shaft extending from said cylinder to the exterior of said residual removal unit with an integral handle at the exposed end of said shaft whereby an operator may manually rotate said handle 180° to effect cylinder rotation.

References Cited

UNITED STATES PATENTS

| | | | |
|---|---|---|---|
| 2,151,990 | 3/1939 | Ruys | 203—47 |
| 2,315,422 | 3/1943 | Hildebrandt | 203—47 |
| 2,615,794 | 10/1952 | Shelby. | |
| 2,788,316 | 4/1957 | Bjorksten | 202—234 |
| 2,863,501 | 12/1958 | Farnsworth | 203—11 X |
| 3,127,243 | 3/1964 | Konikoff | 203—11 X |
| 3,276,848 | 10/1966 | Barr et al. | 23—294 |
| 3,285,834 | 11/1966 | Guerrieri et al. | 202—174 |
| 3,361,649 | 1/1968 | Karter | 203—47 |
| 3,373,088 | 3/1968 | Harkee et al. | 203—11 X |

NORMAN YUDKOFF, Primary Examiner.

F. E. DRUMMOND, Assistant Examiner.

U.S. Cl. X.R.

202—197, 202; 203—11